US009626036B2

(12) United States Patent
Zhang et al.

(10) Patent No.: US 9,626,036 B2
(45) Date of Patent: Apr. 18, 2017

(54) TOUCH CIRCUIT, METHOD FOR DRIVING THE SAME AND TOUCH DISPLAY APPARATUS

(71) Applicant: BOE Technology Group Co., Ltd., Beijing (CN)

(72) Inventors: Yuanbo Zhang, Beijing (CN); Wenbo Li, Beijing (CN); Han-Seung Woo, Beijing (CN); Mi Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 80 days.

(21) Appl. No.: 14/435,501

(22) PCT Filed: Apr. 22, 2014

(86) PCT No.: PCT/CN2014/075950
§ 371 (c)(1),
(2) Date: Apr. 14, 2015

(87) PCT Pub. No.: WO2015/109672
PCT Pub. Date: Jul. 30, 2015

(65) Prior Publication Data
US 2015/0277651 A1    Oct. 1, 2015

(30) Foreign Application Priority Data

Jan. 24, 2014  (CN) .......................... 2014 1 0035228

(51) Int. Cl.
*G06F 3/041*    (2006.01)
(52) U.S. Cl.
CPC ............ *G06F 3/0416* (2013.01); *G06F 3/041* (2013.01)
(58) Field of Classification Search
None
See application file for complete search history.

(56) References Cited

U.S. PATENT DOCUMENTS 9,035,202 B2    5/2015  Mizuhashi et al.
2013/0271420 A1  10/2013 Chen et al.

FOREIGN PATENT DOCUMENTS

| CN | 2495063 Y | 6/2002 |
| CN | 102375607 A | 3/2012 |
| CN | 203673454 U | 6/2014 |

OTHER PUBLICATIONS

First Office Action, including Search Report, for Chinese Patent Application No. 201410035228.4, dated Feb. 29, 2016, 17 pages.
(Continued)

*Primary Examiner* — Kenneth B Lee, Jr.
(74) *Attorney, Agent, or Firm* — Westman, Champlin & Koehler, P.A.

(57) ABSTRACT

An embodiment of the present invention provides a touch circuit, a method for driving a touch circuit and a touch display apparatus, which may achieve a touch display apparatus with a narrower frame. The touch circuit includes: a touch signal input module having a first output end for outputting a touch drive triggering signal and a second output end for outputting a touch clock signal; a plurality of touch control sub-circuits cascaded to each other, each of which has a first input end for inputting the touch drive triggering signal and a second input end for inputting the touch clock signal; and a plurality of touch electrodes, wherein the first output end and the second output end of the touch signal input module are connected to at least one cascade of the touch control sub-circuits and configured to output the touch drive triggering signal and the touch clock signal to the at least one cascade of the touch control sub-circuits, and wherein the touch control sub-circuits are configured to drive the touch electrodes when they are triggered by the touch drive triggering signal and the touch clock signal.

20 Claims, 6 Drawing Sheets

(56) References Cited

OTHER PUBLICATIONS

English translation of Box No. V of the Written Opinion of the International Searching Authority for International Application No. PCT/CN2014/0075950, filed on Apr. 22, 2014, 3 pages.
International Search Report and Written Opinion for PCT Application No. PCT/CN2014/075950, dated Nov. 4, 2014, 8 pages.

TOUCH CIRCUIT, METHOD FOR DRIVING THE SAME AND TOUCH DISPLAY APPARATUS

CROSS-REFERENCE TO RELATED APPLICATION

This Application is a Section 371 National Stage Application of International Application No. PCT/CN2014/075950, filed Apr. 22, 2014, which has not yet published, which claims priority to Chinese Patent Application No. 201410035228.4, filed Jan. 24, 2014 in Chinese, the contents of which are hereby incorporated by reference in their entirety.

BACKGROUND OF THE INVENTION

Field of the Invention

The present disclosure relates to the technical field of display, in particular to a touch circuit, a method for driving a touch circuit and a touch display apparatus.

Description of the Related Art

A touch panel (TP), as an input medium, is integrated with a display screen to form a touch display apparatus. The touch display apparatus plays a role in the field of touch display.

The touch panel may be classified into an in-cell type touch panel and an external hanging type touch panel. In the in-cell type touch panel, circuits for achieving a touch function are embedded in the display screen such that the touch function and image display function may both achieved.

The conventional touch screen at least includes touch drive electrodes and touch sensing electrodes and touch drive circuits connected with the touch drive electrodes and touch sensing circuits connected with the touch sensing electrodes. The touch drive circuits and the touch sensing circuits are connected with the touch drive electrodes and the touch sensing electrodes respectively, via wires. The touch drive circuits are generally implemented as touch chips (that is, touch ICs) and the touch sensing circuits are generally implemented as sensing ICs. Typically, the touch ICs and the sensing ICs are both arranged on a flexible circuit board and wires are arranged in frame areas of the touch screen.

As the frame of the touch screen become narrower as required, obviously, the above touch drive circuits and the touch sensing circuits need more complex wirings to achieve the touch drive function and the sensing function. It may cause difficulty of achieving a narrow frame of the touch screen and may increase power consumption of the touch screen.

SUMMARY OF THE INVENTION

An object of the present invention is to remove at least one aspect of the above issues and defects in the prior art.

An embodiment of the present invention provides a touch circuit, a method for driving a touch circuit and a touch display apparatus, which may achieve a novel touch circuit on a panel and a touch display apparatus with a narrower frame.

In accordance with one aspect, it provides a touch circuit, characterized by comprising: a touch signal input module having a first output end for outputting a touch drive triggering signal and a second output end for outputting a touch clock signal; a plurality of touch control sub-circuits cascaded to each other, each of which has a first input end for inputting the touch drive triggering signal and a second input end for inputting the touch clock signal; and a plurality of touch electrodes, wherein the first output end and the second output end of the touch signal input module are connected to at least one cascade of the touch control sub-circuits and configured to output the touch drive triggering signal and the touch clock signal to the at least one cascade of the touch control sub-circuits, and wherein the touch control sub-circuits are configured to drive the touch electrodes when they are triggered by the touch drive triggering signal and the touch clock signal.

In accordance with another aspect, it also provides a touch display apparatus, characterized by further comprising the touch circuit described in the above embodiments.

In accordance with another aspect, it also provides a method for driving a touch circuit, comprising the following steps:

in a touch phase, a touch signal input module outputs a touch drive triggering signal and a touch clock signal to a plurality of touch control sub-circuits cascaded to each other, the plurality of touch control sub-circuits being connected to the touch signal input module; and the touch control sub-circuits drive touch electrodes connected with them when they are triggered by the touch drive triggering signal and the touch clock signal.

BRIEF DESCRIPTION OF THE DRAWINGS

In order to explain the technical solutions in embodiments of the present invention or in the prior art more clearly, the figures that are use to illustrate the embodiments or the prior art will be described briefly below. Apparently, the following figures only show some embodiments of the present invention. From these figures, the skilled person in the art may derive other figures without paying inventive labors.

DETAILED DESCRIPTION OF PREFERRED EMBODIMENTS OF THE INVENTION

The embodiments of the present invention will be further explained below with reference to the figures and examples. Throughout the description, same or similar reference numbers indicate the same or similar members. The following embodiments along with the figures are only used to explain the general concept of the present invention, instead of being intended to limit the scope of the present invention.

An embodiment of the present invention provides a touch circuit, a method for driving a touch circuit and a touch display apparatus, which may achieve a novel touch circuit on a panel and avoid complex wirings while achieving a touch drive function or a sensing function.

An embodiment of the present invention provides a novel touch circuit which is composed of a plurality of shift register units provided on a substrate base of the touch screen and arranged on a frame area. In this way, a great deal of wirings on the frame area are avoided. Instead, the touch electrodes may be driven only by the shifting function of the shift register units.

Figure 1:
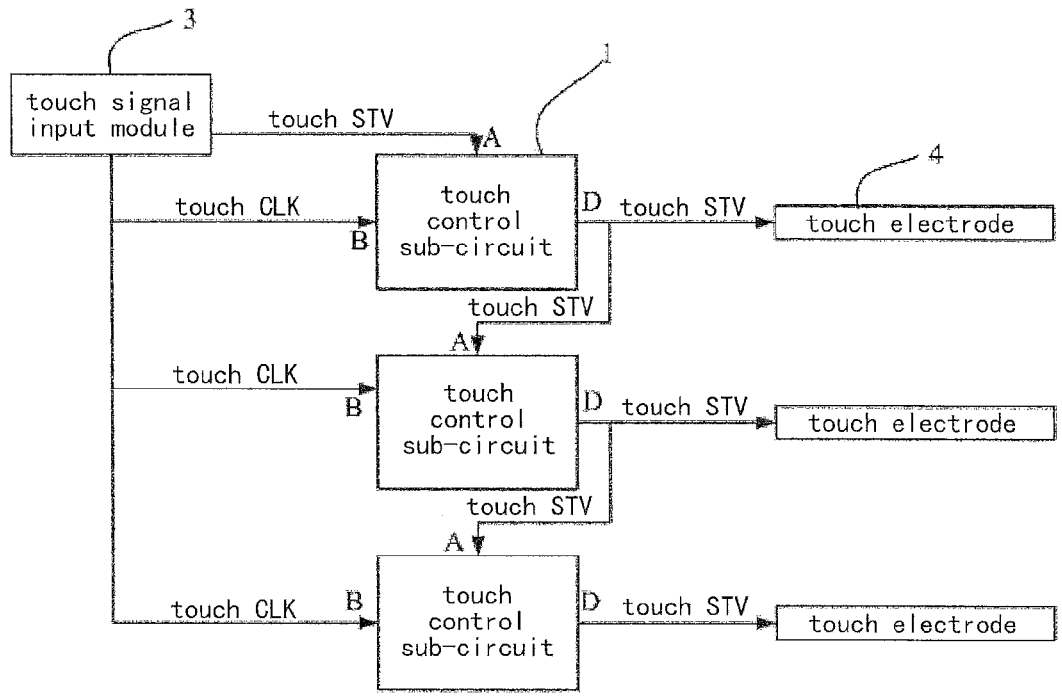
FIG. 1 is the first view showing a touch circuit arrangement provided by an embodiment of the present invention.

With reference to FIG. 1, the touch circuit provided by the embodiment of the present invention includes:

a plurality of touch control sub-circuits 1 cascaded to each other, a plurality of touch electrodes 4 and a touch signal input module 3.

The touch signal input module 3 is configured to output a touch drive triggering signal (touch STV) and a touch clock signal (touch CLK) into the at least one cascade of the touch control sub-circuits 1.

The plurality of touch control sub-circuits 1 are configured to drive the corresponding touch electrodes 4 when they are triggered by the touch drive triggering signal and the touch clock signal.

It should be understood that the touch electrodes may be touch drive electrodes or touch sensing electrodes and that the touch drive signal may be a signal Tx for driving the touch drive electrodes or a signal Rx for driving the touch sensing electrodes.

As an example, N touch control sub-circuits cascaded to each other may be the first cascade of the touch control sub-circuits, the second cascade of the touch control sub-circuits, . . . , the Nth cascade of the touch control sub-circuits, in sequence of from top to bottom. FIG. 1 shows a touch circuit only having definite touch control sub-circuits and touch electrodes as an example.

The touch control sub-circuits 1 have output ends (D ends) which are connected to the corresponding touch electrodes 4 and configured to control the touch electrodes 4 connected with them to be conducted or cut off. The output ends (D ends) of the touch control sub-circuits 1 are connected to first input ends (A ends) of at least one other cascades of the touch control sub-circuits and output the touch drive triggering signal (i.e., touch STV) to the first input ends (A ends) connected with them.

As an example, the output end (D end) of each cascade of the touch control sub-circuits 1 is connected with the first input ends (A ends) of the adjacent next cascade of the touch control sub-circuits 1 while being connected with the first input ends of the touch electrodes 4. Each cascade of the touch control sub-circuits 1 is configured to control the touch electrodes 4 connected with them to be conducted or cut off while it outputs the touch drive triggering signal (i.e., touch STV) to the next cascade of the touch control sub-circuits 1.

Of course, the present invention is not limited by the above arrangements. For example, the output end (D end) of each cascade of the touch control sub-circuits 1 is connected with the first input ends (A ends) of the next two, three, even more cascades of the touch control sub-circuits 1. The touch control sub-circuits that are not adjacent to each other may also be cascaded to each other, for example, the output end (D end) of the first cascade of the touch control sub-circuits 1 is connected with the first input end (A end) of the third cascade of the touch control sub-circuits 1.

The touch signal input module 3 is configured to input the touch drive triggering signal (STV) and the touch clock signal (CLK) into one or more cascades of the touch control sub-circuits. For example, it may input the touch drive triggering signal (STV) and the touch clock signal (CLK) into the first cascade of the touch control sub-circuits while inputting the touch clock signal (CLK) into other touch control sub-circuits.

The touch control sub-circuits 1 may drive the touch electrodes 4 in sequence, or they may drive the plurality of touch electrodes 4 simultaneously, which may be provided as required.

The touch circuit in the embodiment of the present invention is a novel touch circuit, by which the touch drive signal (for example, the signal for driving the touch drive electrodes or touch sensing electrodes) is provided to the touch electrodes. It only needs to input the touch STV to at least one cascade (e.g., the first cascade) of the touch control sub-circuits, and the shift function of the respective touch control sub-circuits may be configured to apply signals to the respective touch electrodes.

In another example, in order to optimize the driving operations of the touch control sub-circuits 1 to the touch electrodes 4, the touch signal input module 3 of the touch circuits is further configured to output the touch drive signal (TX) (not shown) to the touch control sub-circuits 1 such that the touch control sub-circuits 1 drive the touch electrodes 4 under the action of the touch drive triggering signal (touch STV) and the touch clock signal (touch CLK).

In addition, the touch circuit may be provided in the frame area of the touch screen and may have a simplified structure in comparison with the case that the wirings and the touch chip are arranged in the frame area of the touch screen. In this way, the occupy rate of the frame area in the touch screen may be saved and thus the touch display apparatus with the narrower frame may be achieved.

In the following description, the touch drive electrodes will be taken as the example of the touch electrodes.

Figure 2:
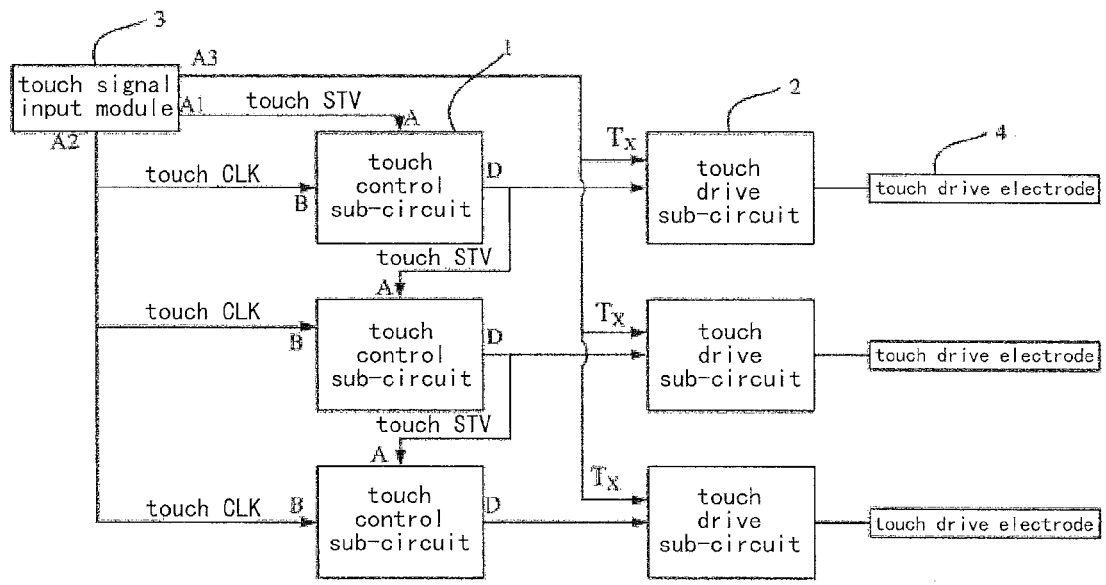
FIG. 2 is the second view showing a touch circuit arrangement provided by an embodiment of the present invention.

With reference to FIG. 2, the touch circuit provided by the embodiment of the present invention at least includes:

a plurality of touch control sub-circuits 1 cascaded to each other, a plurality of touch drive sub-circuits 2 and a plurality of touch electrodes 4, the touch control sub-circuits 1 corresponding to the touch drive sub-circuits 2 and the touch electrodes 4 respectively. The touch circuit further includes a touch signal input module 3 connected with both the touch control sub-circuits 1 and the touch drive sub-circuits 2.

The touch signal input module 3 has a first output end (A1 end) connected with the first input end (A end) of the first cascade of the touch control sub-circuits 1 and is configured to output the touch drive triggering signal (i.e., touch STV) to the first cascade of the touch control sub-circuits 1.

The touch signal input module 3 has a second output end (A2 end) connected with the second input end (B end) of the touch control sub-circuits 1 and is configured to output the touch clock signal (i.e., touch CLK) to the respective touch control sub-circuits 1.

The touch signal input module 3 has a third output end (A3 end) connected with the second input end of the touch drive sub-circuits 2 corresponding to the respective touch control sub-circuits 1 and is configured to output the touch drive signal (TX) to the touch drive sub-circuits 2. For example, when the touch drive sub-circuits 2 are conducted, the touch drive signal TX is outputted to the touch drive electrodes 4 corresponding to the touch drive sub-circuits 2.

As an example, the output end (D end) of each cascade of the touch control sub-circuits 1 is connected with the first input end (A end) of the next cascade of the touch control sub-circuits 1 while being connected with the first input ends of the touch drive sub-circuits 2. Each cascade of the touch control sub-circuits 1 is configured to control the touch drive sub-circuits 2 connected with them to be conducted or cut off while it outputs the touch drive triggering signal (i.e., touch STV) to the next cascade of the touch control sub-circuits 1.

It should be noted that the touch control sub-circuits cascaded to each other may be the first cascade of the touch control sub-circuits, the second cascade of the touch control sub-circuits, . . . , the Nth cascade of the touch control sub-circuits, in sequence of from top to bottom. FIG. 2 shows a touch circuit only having definite touch control sub-circuits and touch drive sub-circuits as an example.

In addition, in the present disclosure, the correspondence of the above touch control sub-circuits 1 to the touch drive sub-circuits 2 and the touch drive electrodes 4 may include multiple cases, for example, in the first case, the touch control sub-circuits 1 and the touch drive sub-circuits 2 are in one-to-many mapping or in many-to-one mapping; and in the second case, the touch drive sub-circuits 2 and the touch drive electrodes 4 are in one-to-many mapping or in many-to-one mapping.

As an example, one of the touch control sub-circuits 1 corresponds to one of the touch drive sub-circuits 2 and one of the touch drive electrodes 4.

In the present disclosure, by the above touch circuit providing a touch drive signal TX to the touch electrodes, it only needs to input a touch STV into the first cascade of the touch control sub-circuits. The shift function of respective touch control sub-circuits may be configured to apply the touch drive signal to the respective touch electrodes. And the touch drive signal may be selectively inputted into the touch drive electrodes 4 by control of the touch drive sub-circuits 2. The touch circuit is a novel one. In addition, the touch circuit may be provided in the frame area of the touch screen and may have a simplified structure in comparison with the case that the wirings and the touch chip are arranged in the frame area of the touch screen. In this way, the occupy rate of the frame area in the touch screen may be saved and thus the touch display apparatus with the narrower frame may be achieved.

In an example, in the touch circuit shown in FIG. 2, the touch control sub-circuits 1 may be implemented by shift register units. For example, the touch control sub-circuits 1 include at least one shift register units 11, that is, the shifting function of the respective cascades of the touch control sub-circuits may be achieved by means of the shift storage function of the shift register units to further achieve the operation of applying the touch drive signal TX to the respective touch electrodes. Certainly, the shift register units may be those well-known in the art.

In an embodiment, the used shift register units (or for short, shift register) are same as those in an array substrate row drive circuit (i.e., Gate Driver on Array, abbreviated as GOA). The details will be omitted below. Further, the shift register units may be varied as required.

Figure 3:
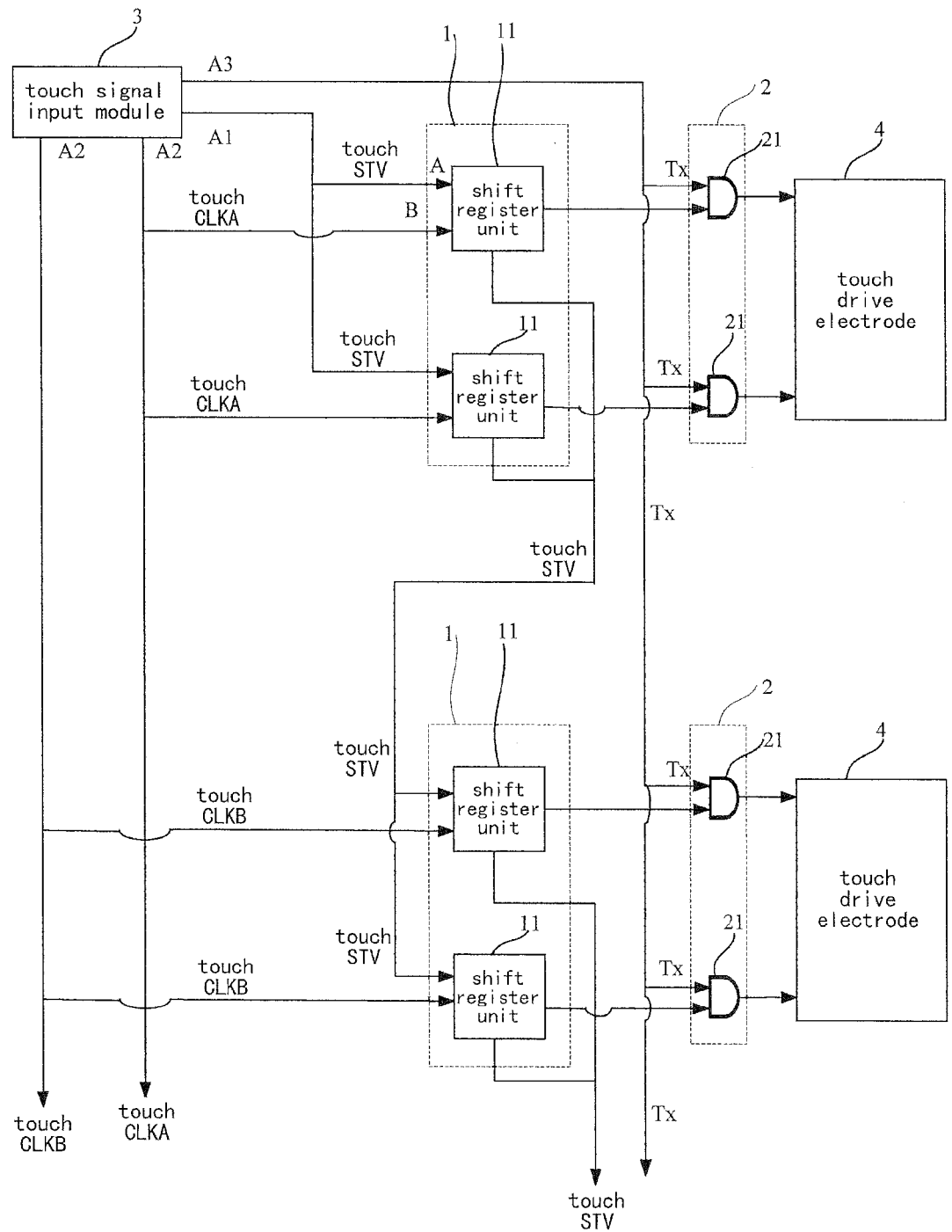
FIG. 3 is the third view showing a touch circuit arrangement provided by an embodiment of the present invention.

With reference to FIG. 3, the touch control sub-circuits 1 each include a plurality of shift register units 11 cascaded to each other. As illustrated in FIG. 3, the touch control sub-circuit 1 including two shift register units 11 is taken as an example.

As an example, the touch drive sub-circuits 2 connected with the touch control sub-circuits 1 each include a first gating circuit 21 which corresponds to and is connected with a shift register unit 11 in the touch control sub-circuits 1.

The output ends of the respective shift register units 11 in the touch control sub-circuits 1 are connected to the first input ends of the corresponding first gating circuit 21.

In particular, the third output end (A3 end) of the touch signal input module 3 is connected with the first input ends of the respective gating circuits 21. The second output end (A2 end) of the touch signal input module 3 is connected with the second input ends (B ends) of the shift register units 11. The first output end (A1 end) of the touch signal input module 3 is connected with the first input ends (A ends) of the respective shift register units 11 in the touch control sub-circuit 1.

As an example, the first gating circuit may be any circuits that are configured to output different signals selectively or the combination thereof, for example, the first gating circuit may be an AND gate circuit or NOT gate circuit, which has a simple structure.

The output ends of the respective first gating circuits 21 that belong to the same touch drive sub-circuit 2 are connected with the corresponding touch electrodes 6.

The output ends of the respective shift register units 11 that belong to the same touch control sub-circuit 1 are connected with the first input ends of the respective shift register units 11 of the next cascade of the touch control sub-circuit 1.

Certainly, when each of the touch control sub-circuits 1 includes a plurality of shift register units 11, the output end of one of the shift register units 11 in the previous cascade of the touch control sub-circuits 1 may be connected with the first input end of the respective shift register units 11 in the next cascade of the touch control sub-circuits 1. For example, the output end of the last shift register unit 11 in the previous cascade of the touch control sub-circuits 1 is connected with the first input end of the first shift register unit 11 or the first input ends of the respective shift register units 11 in the next cascade of the touch control sub-circuits 1.

It should be noted that the first input end of the shift register unit 11 shown in FIG. 3 is the first input end of the touch control sub-circuits 1; the second input end of the shift register unit 11 shown in FIG. 3 is the second input end of the touch control sub-circuits 1; and the output end of the shift register unit 11 shown in FIG. 3 is the output end of the touch control sub-circuits 1.

The second output end (A2 end) of the touch signal input module 3 in the embodiment of the present invention may output a touch clock signal. The touch clock signal triggers the respective touch control sub-circuits 1 to become active in sequence, that is, the clock signal as shown in FIG. 2 (touch CLK); or it outputs two clock signals with opposite phases triggering the corresponding touch control sub-circuits 1 to become active respectively, that is, the touch CLKA and touch CLKB as shown in FIG. 3, or the touch CLKA and touch CLKB output the same touch control sub-circuits 1. The embodiments of the present invention are not limited to this. The number of the touch clock signals may be set as required.

In an embodiment, the touch signal input module 3 in the present disclosure outputs the first touch clock signal (touch CLKA as shown in FIG. 3) and the second touch clock signal (touch CLKB as shown in FIG. 3). The touch CLKA outputted from the touch signal input module is configured to trigger the odd cascades of the touch control sub-circuits while the touch CLKB outputted from the touch signal input module is configured to trigger the even cascades of the touch control sub-circuits. The first touch clock signal has the phase opposite to that of the second touch clock signal.

In order to explain the connection relation between the touch CLKA, touch CLKB and the shift register units more clearly, assuming that the first touch control sub-circuit 1 shown in FIG. 3 is an odd cascade of the touch control sub-circuits, the second input end of the respective shift register units 11 in the touch control sub-circuits 1 are connected with the touch signal input module 3 respectively, in particular, connected with the ports for outputting the touch CLKA in the touch signal input module 3.

Assuming that the second touch control sub-circuit 1 shown in FIG. 3 is an even cascade of the touch control sub-circuits, the second input end of the respective shift register units 11 in the touch control sub-circuits 1 are connected with the touch signal input module 3 respectively, in particular, connected with the ports for outputting the touch CLKB in the touch signal input module 3.

Figure 4:
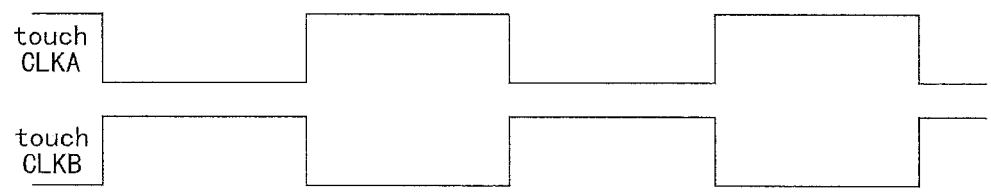
FIG. 4 is a timing diagram of touch clock signals CLKA and CLKB provided by an embodiment of the present invention.

FIG. 4 shows a timing diagram of the touch clock signals CLKA and CLKB. Seen from FIG. 4, the touch clock signals CLKA and CLKB have opposite phases. Within the period in which the touch CLKA is outputted, the touch CLKB is stopped to be outputted. Within the period in which the touch CLKB is outputted, the touch CLKA is stopped to be outputted. It may avoid the signal interference between the touch control sub-circuits 1 to improve the touch effects.

In the present disclosure, in order to optimize the output of the touch drive triggering signal (touch STV) from the previous cascade of the touch control sub-circuits 1 shown in FIG. 2 or FIG. 3, the touch STV is outputted to the next cascade of the touch control sub-circuits 1. That is, in order to optimize different cascades of the touch control sub-circuits 1, the touch drive sub-circuits 2 are controlled in sequence to drive the corresponding touch electrodes. The touch circuit provided by the embodiment of the present invention further includes a first switching tube among the touch control sub-circuits 1.

Figure 5:
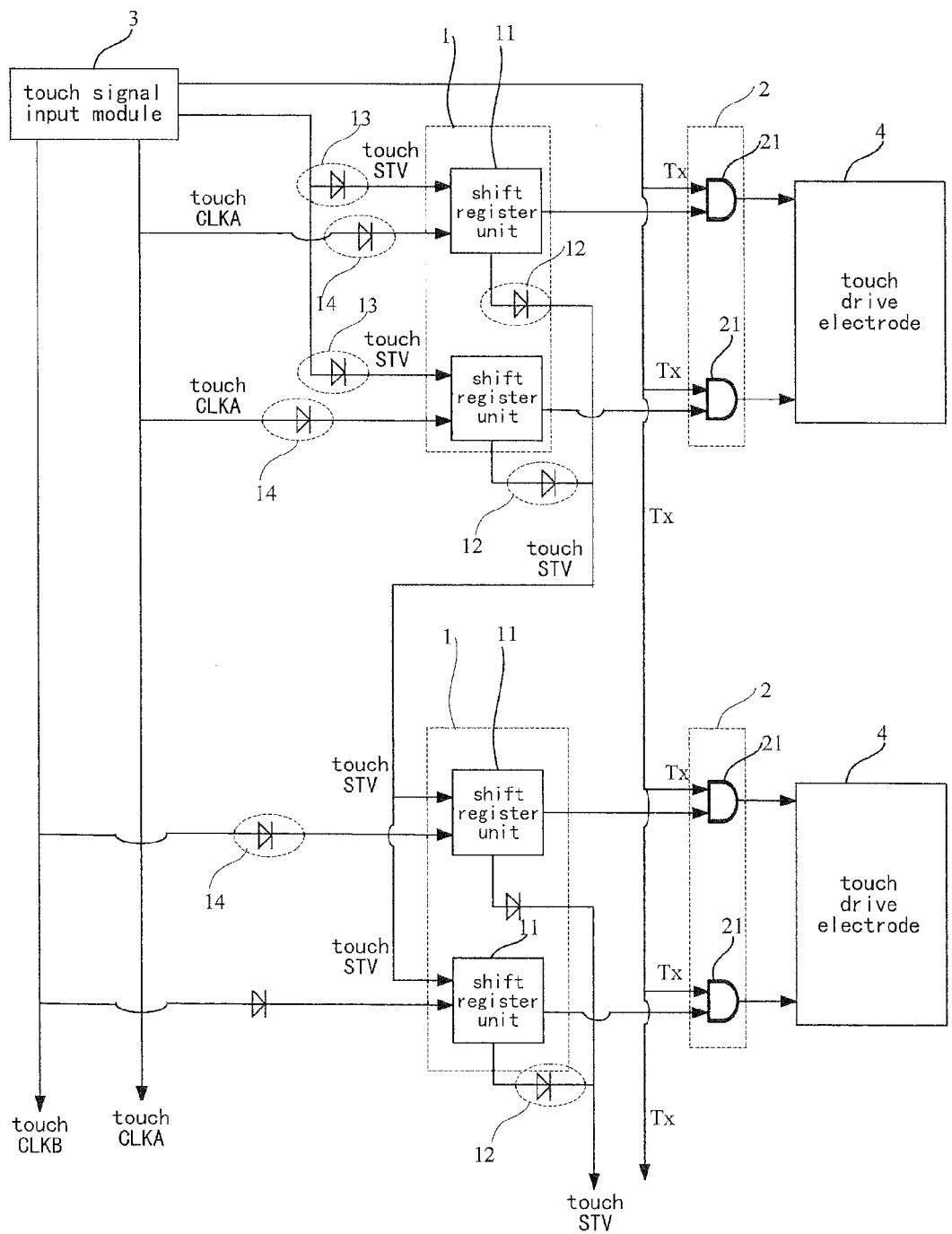
FIG. 5 is the third view showing a touch circuit arrangement provided by an embodiment of the present invention.

As an example, with reference to FIG. 5, each of the touch control sub-circuits 1 provided by the embodiment of the present invention further includes a first switching tube 12 between the output end of the respective shift register units 11 of each of the previous cascades of the touch control sub-circuits 1 and the first input end of the respective shift register units 11 of the next cascade of the touch control sub-circuits 1.

In an embodiment, the first switching tube 12 is a diode which has a positive end connected to the output end of the shift register units 11 in the previous cascade of the touch control sub-circuits 1 and a negative end connected to the first input end of the shift register units 11 in the next cascade of the touch control sub-circuits 1.

In another example, the touch circuit provided by the embodiment of the present invention further includes: a control switching tube 13 between the touch signal input module 3 and the touch control sub-circuits 1.

As an example, with reference to FIG. 5, the touch circuit provided by the embodiment of the present invention further includes: a second switching tube 13 located between the touch signal input module 3 and the first input end of each of the shift register unit 11.

In an embodiment, the second switching tube 13 is a diode which has a positive end connected to the output end of the touch signal input module 3 and a negative end connected to the first input end of the respective shift register units 11.

It should be noted that, as the first input ends of the shift register units 11 in the first cascade of the touch control sub-circuits 1 are connected with the touch signal input module 3, the first input ends of the shift register units 11 in other touch control sub-circuits 1 are connected with the output ends of the shift register units 11 in the previous cascade of the touch control sub-circuits 1. Thus, the second switching tube 13 may be located only between the touch signal input module 3 and the first input end of each of the shift register units 11 in the first cascade of the touch control sub-circuits 1.

In another example, with reference to FIG. 5, the touch control sub-circuits 1 provided by the embodiment of the present invention each further include:
a third switching tube 14 located between the touch signal input module 3 and the second input ends of the respective shift register units 11.

In an embodiment, the third switching tube 14 is a diode which has a positive end connected to the output end of the touch signal input module 3 and a negative end connected to the second input ends of the respective shift register units 11. The touch signal input module 3 outputs the touch clock signal to the second input end of the touch control sub-circuits 1.

It should be noted that the first switching tube 12, the control switching tube (including the second switching tube 13 and the third switching tube 14) shown in FIG. 5 are both optional, that is, the touch circuit provided by the embodiment of the present invention may include one or more of the first switching tube 12, the second switching tube 13 and the third switching tube 14. Of course, the present invention is not limited to this. Other switching tubes may be provided as requirements.

In an embodiment, with reference to FIG. 5, the touch circuit includes the first switching tube 12, the second switching tube 13 and the third switching tube 14.

All of the first switching tube, the second switching tube and the third switching tube are configured to be switched on at a desired time such that the respective circuit modules in the touch circuit may work in order under the timing control to prevent the errors in the input signals of the respective circuit modules in the touch circuit.

Figure 6:
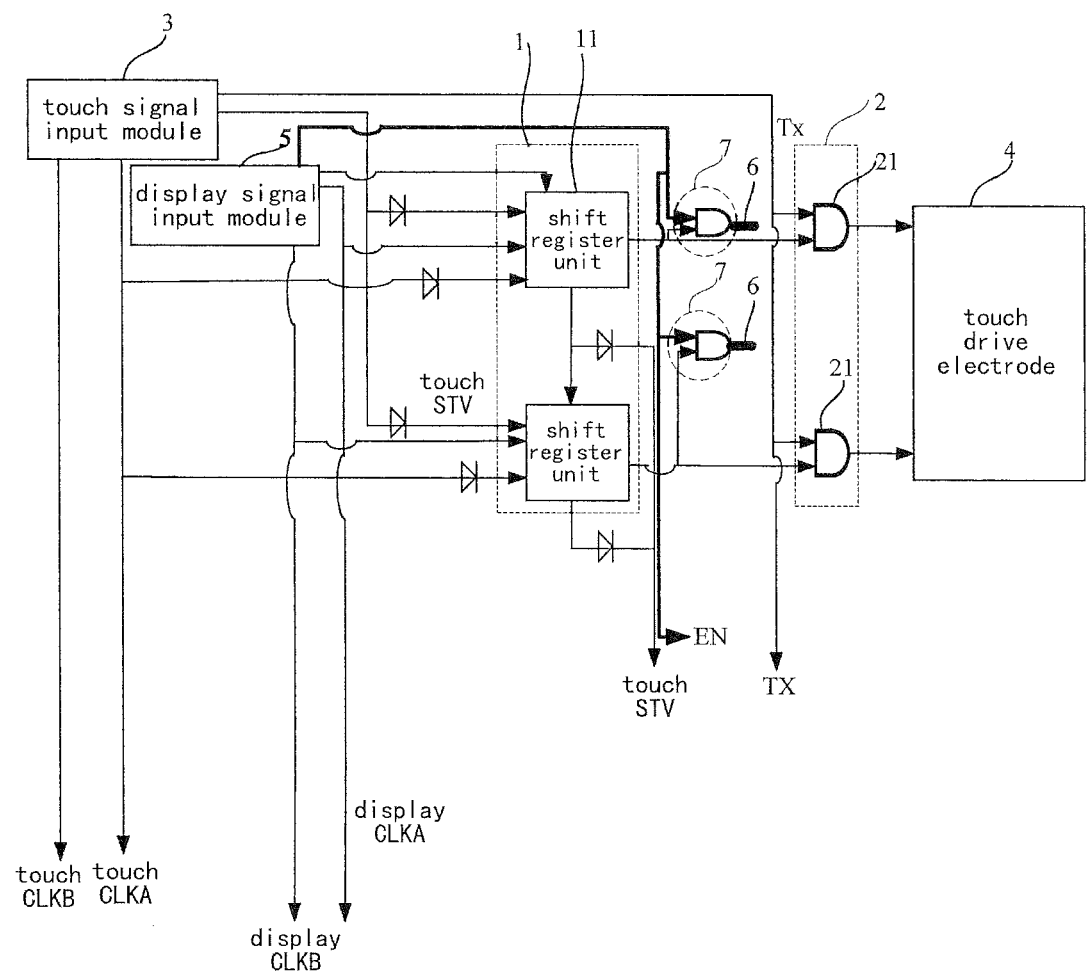
FIG. 6 is the fourth view showing a touch circuit arrangement provided by an embodiment of the present invention.

In another example, as shown in FIG. 6, the touch circuit further includes:
a display signal input module 5 connected with the touch control sub-circuits 1 and configured to input a display triggering signal and a display clock signal to at least one cascade of the touch control sub-circuits.

As an example, the display signal input module 5 is connected to the first input end of the first shift register unit 11 in the first cascade of the touch control sub-circuits 1. The output end of the previous cascade of the shift register units 11 in each of the touch control sub-circuits 1 is connected to the first input end of the next cascade of the shift register units 11.

The output end of the last cascade of the shift register units 11 in the previous cascade of the touch control sub-circuits 1 is connected to the first input end of the first cascade of the shift register units 11 in the next cascade of the touch control sub-circuits 1.

The output end of each of the shift register units 11 corresponds to and is connected to one gate line 6.

The display signal input module 5 is configured to, in a display phase, output a display triggering signal (display STV) to the first input end of the first shift register unit 11 in the first cascade of the touch control sub-circuits 1 and to input a display clock signal into the second input end of the respective shift register units 11 in the respective touch control sub-circuits 1. The signal outputted from the output end of the respective shift register units 11 is a gate drive signal. That is, the touch circuit shown in FIG. 6 may also be used as a gate drive circuit. In the In-Cell touch screen technology, the pixel charging and the touch scan may be interfered to each other. Typically, after all of pixels have been charged, a period is left for performing the touch signal scan, that is, the pixel charging and the touch scan are performed separately. That is, the clock period corresponding to one frame of image includes a display phase and a touch phase.

In addition, for the In-Cell touch screen, the touch screen and the display screen are integrated with each other and a gate drive circuit for display (provided in the array substrate row drive circuit herein and formed by a plurality of shift register units, i.e., Gate Driver on Array, abbreviated as GOA) is arranged in the frame area of the display panel. The gate drive circuit and the touch circuit are common, and thus a touch display apparatus with narrower frame and lower power consumption.

In an embodiment, the touch signal input module and the display signal input module provided by the embodiment of the present invention are the same module which outputs different signals in the different periods. For example, in the touch phase, the touch clock signal and the touch triggering signal are outputted in sequence depending on the timing; and in the display phase, the display clock signal and the display triggering signal are outputted in sequence depending on the timing.

In order to avoid the errors in output of the touch drive signal and the gate drive signal, the touch circuit shown in FIG. 6 further includes:

a second gating circuit 7 located between the output end of the touch control sub-circuits 1 and the corresponding gate line 6, for example, the second gating circuit 7 located between the output end of the shift register unit 11 and the corresponding gate line 6, the output end of the second gating circuit 7 being connected with one gate line 6.

In an embodiment, the second gating circuit 7 is an AND gate circuit which has a first input end connected with the output end of the shift register unit 11 and a second input end connected with the display signal input module 5. The display signal input module 5 is configured to output an enable signal (EN signal) for switching on a gate to the second input end of the AND gate circuit.

In another example, the shift register in the above touch circuit includes: shift register units for driving the touch electrodes (for the short, shift registers for touch) and shift register units for driving the corresponding gate lines (for the short, shift registers for display).

In an example, in a touch control circuit including two shift register units, one of the shift register units is used to drive the touch electrodes, the other is used to drive the corresponding gate lines.

Further, the shift register units for driving the touch electrodes are cascaded to each other and the shift register units for driving the corresponding gate lines are cascaded to each other.

In another example, the above touch circuit includes one or more of the shift register units for driving the corresponding gate lines cascaded to the shift register units for driving the touch electrodes.

The shift register units for driving the corresponding gate lines are located in the touch control sub-circuits or between adjacent two touch control sub-circuits.

In other words, the above touch circuit further includes one or more shift register units for driving gates. The shift register units may be located between the shift register units for driving the touch electrodes, or may be located behind the shift register units for driving the touch electrodes. The shift register units for driving gates and the shift register units for driving the touch electrodes are cascaded to each other. In an embodiment, in the display phase, the shift register units for driving the touch electrodes may also be used to drive the gates, that is, all of shift register units in the display phase are used to drive the gates; in the touch phase, the shift register units for driving the gates are switched off while the shift register units for driving the touch electrodes are switched on, to drive the touch electrodes.

The output ends of one or more shift register units 11 between two adjacent shift register units 11 in each of the touch control sub-circuits 1 are connected to the gate lines 6. The first input end is connected to the output end of the previous cascade of the shift register units 11 while the second input end is connected to the display signal input module 5.

An embodiment of the present invention provides a method for driving a touch circuit as described in the above embodiments, comprising:

in a touch phase, a touch signal input module outputs a touch drive triggering signal and a touch clock signal to a plurality of touch control sub-circuits cascaded to each other; and the touch control sub-circuits drive touch electrodes connected with them when they are triggered by the touch drive triggering signal and the touch clock signal.

In an embodiment, the method may further include: in a display phase, the touch signal input module outputs a gate drive triggering signal and a display clock signal to the plurality of touch control sub-circuits cascaded to each other; and the touch control sub-circuits drive gate lines connected with them when they are triggered by the gate drive triggering signal and the display clock signal.

Figure 7:
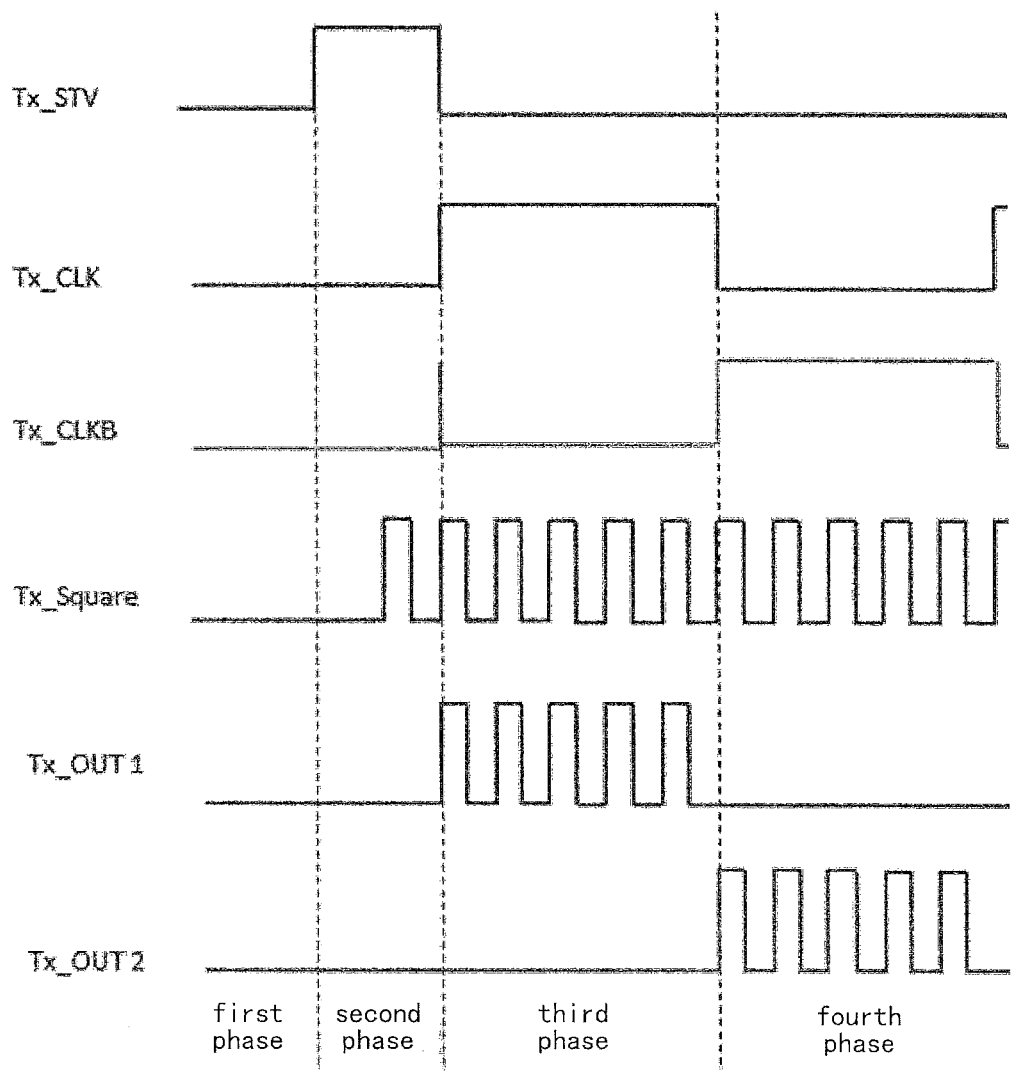
FIG. 7 is a timing diagram of the touch circuit provided by an embodiment of the present invention, which achieves a touch function and a display function.

With reference to FIG. 7, which shows a timing diagram of the touch circuit achieving the touch function and the display function, when the touch circuit has the function of driving the gates, the process of pixel charging and touch display includes the following phases:

First phase: pixel charging period in which the shift register units for driving the gates and the shift register units for driving the touch electrodes work normally and in which the touch clock signal (Tx_CLK), the touch triggering signal (Tx_STV) and the touch drive information (Tx_square) are held at a low level;

Second phase: the touch scan begins to work, Tx_STV is inputted as an input signal of the first cascade of the touch control sub-circuits and Tx_CLK begins to input the clock signal having a clock period which is equal to the time that it takes to assign one row of Tx scan; Tx_square begins to output rectangular waves having a width which is approximately equal to the desired pulse width for touch scan signal (one row of Tx scan includes a plurality of pulses), typically, a few micrometers to tens of micrometers;

Third phase: the first cascade of the touch control sub-circuits and the corresponding touch drive sub-circuits achieve the function of shift storage; the first cascade of the touch control sub-circuits outputs square waves required for forming Tx output by Tx_square via the AND gate, to Tx output 1; at the same time, the output of the current cascade of the touch drive sub-circuits is also used as the input signal of the next cascade of the touch drive sub-circuits;

Fourth phase: the second cascade of the touch control sub-circuits and the corresponding touch drive sub-circuits achieve the function of shift storage; Tx output 2 begins to output pulse square waves and the subsequent touch control sub-circuits perform shift register in sequence and switch on Tx output one row by one row until all of Tx output scans end; after one frame is completed, the next frame of pixels will be charged.

The present disclosure provides a novel touch circuit. Further, the present disclosure also achieve a touch screen with narrow frame and low power consumption by arranging the touch circuit in the frame area of the array substrate without drive IC and complex wirings.

An embodiment of the present invention provides a touch display apparatus including the touch circuit. The display apparatus may be such as a touch screen, a touch panel, a touch TV or a touch computer.

Although the present disclosure is provided with reference to figures, all of the embodiments shown in figures are intended to explain the preferred embodiments of the present invention by ways of examples, instead of being intended to limit the present invention.

Apparently, it would be appreciated by those skilled in the art that various changes or modifications may be made in the present disclosure without departing from the principles and spirit of the disclosure, which are intended to be covered by the present invention as long as these changes or modifications fall within the scope defined in the claims and their equivalents.

What is claimed is:

1. A touch circuit, characterized by comprising:
    a touch signal input module having a first output end for outputting a touch drive triggering signal, a second output end for outputting a touch clock signal and a third output end for outputting a touch drive signal;
    a plurality of touch control sub-circuits cascaded to each other, each of which has a first input end for inputting the touch drive triggering signal and a second input end for inputting the touch clock signal;
    a plurality of touch drive sub-circuits corresponding to the plurality of touch control sub-circuits respectively and configured to receive the touch drive signal from the touch signal input module; and
    a plurality of touch electrodes, wherein the first output end and the second output end of the touch signal input module are connected to at least one cascade of the touch control sub-circuits and configured to output the touch drive triggering signal and the touch clock signal to the at least one cascade of the touch control sub-circuits,
    wherein each of the touch control sub-circuits is configured to control one of the touch drive sub-circuits connected therewith to be conducted or cut off based on the touch drive triggering signal and the touch clock signal, and
    each of the touch drive sub-circuits is configured to output the received touch drive signal to one of the touch electrodes connected therewith when being conducted.

2. The touch circuit according to claim 1, characterized in that the first output end of the touch signal input module is connected to the first input end of the first cascade of the touch control sub-circuits and configured to output the touch drive triggering signal to the first cascade of the touch control sub-circuits;
    the second output end of the touch signal input module is connected to the second input end of each cascade of the touch control sub-circuits and configured to output the touch clock signal to the each cascade of the touch control sub-circuits; and
    the output end of the each cascade of the touch control sub-circuits is connected to the first input end of its next cascade of the touch control sub-circuits and configured to output the touch drive triggering signal to the next cascade of the touch control sub-circuits.

3. The touch circuit according to claim 2,
    the plurality of touch drive sub-circuits are located between the touch electrodes and the touch control sub-circuits.

4. The touch circuit according to claim 3, characterized in that
    the touch drive sub-circuits have first input ends for inputting the touch drive signal and second input ends for inputting the touch drive triggering signal; the third output end of the touch signal input module is connected with the first input ends of all of the touch drive sub-circuits and configured to output the touch drive signal to the touch drive sub-circuits; and
    the second input ends of the touch drive sub-circuits are connected to the output ends of the corresponding touch control sub-circuits and the touch drive sub-circuits are configured to control the touch drive signal and drive the touch electrode connected with them when they are triggered by the touch drive triggering signal.

5. The touch circuit according to claim 1, characterized in that the touch control sub-circuits each comprise at least one shift register unit.

6. The touch circuit according to claim 3, characterized in that the touch control sub-circuits each comprise at least one shift register unit;
    the touch drive sub-circuits each comprise at least one first gating circuit corresponding to the shift register unit;
    an output end of the shift register unit is connected to a first input end of the corresponding first gating circuit;
    the third output end of the touch signal input module is connected to a second input end of the first gating circuit;
    the first output end of the touch signal input module is connected to a first input end of the shift register unit;
    the second output end of the touch signal input module is connected to a second input end of the shift register unit;
    the output ends of the first gating circuits of the touch control sub-circuits are connected to the corresponding touch electrodes; and the output ends of the shift register units of the touch control sub-circuits are connected to the first input ends of the shift register units of the next cascades of touch control sub-circuits.

7. The touch circuit according to claim 6, characterized in that the touch clock signal outputted by touch signal input module to the touch control sub-circuits comprises a first touch clock signal and a second touch clock signal.

8. The touch circuit according to claim 7, characterized by further comprising a first switching tube between the previous cascade of the touch control sub-circuits and the next cascade of the touch control sub-circuits.

9. The touch circuit according to claim 8, characterized by further comprising a control switching tube between the touch signal input module and the touch control sub-circuits.

10. The touch circuit according to claim 9, characterized in that the control switching tube comprises:
    a second switching tube located between the touch signal input module and the second input end of each shift register unit;
    and/or a third switching tube located between the touch signal input module and the first input end of each shift register unit.

11. The touch circuit according to claim 1, characterized by further comprising:

a display signal input module configured to input a display triggering signal and a display clock signal to at least one cascade of the touch control sub-circuits.

12. The touch circuit according to claim 11, characterized in that the touch control sub-circuits each comprise at least one shift register unit;
the touch circuits each further comprise a second gating circuit between the output end of the shift register unit and the corresponding gate line;
a first input end of the second gating circuit is connected to the output end of the shift register unit, the second input end of the second gating circuit is connected to the display signal input module, and the output end of the second gating circuit is connected to the gate line;
the display signal input module is configured to output a gate enabling signal to the second input end of the second gating circuit.

13. The touch circuit according to claim 6, wherein the first gating circuit is an AND gate circuit.

14. The touch circuit according to claim 12, wherein the second gating circuit is an AND gate circuit.

15. The touch circuit according to claim 11, characterized by further comprising:
a plurality of shift register units for display located between adjacent touch control sub-circuits respectively and are cascaded to the shift register units in the touch control sub-circuits.

16. A touch display apparatus, characterized by further comprising the touch circuit according to claim 1.

17. A method for driving a touch circuit, comprising the following steps:
in a touch phase, a touch signal input module outputs a touch drive triggering signal and a touch clock signal to a plurality of touch control sub-circuits cascaded to each other and outputs a touch drive signal to a plurality of touch drive sub-circuits corresponding to the plurality of touch control sub-circuits respectively, the plurality of touch control sub-circuits being connected to the touch signal input module;
the touch control sub-circuits control the touch drive sub-circuits connected therewith to be conducted or cut off based on the touch drive triggering signal and the touch clock signal; and
the touch drive sub-circuits output the received touch drive signal to the touch electrodes connected therewith when being conducted.

18. The method according to claim 17, characterized by further comprising:
in a display phase, the touch signal input module outputs a gate drive triggering signal and a display clock signal to the plurality of touch control sub-circuits cascaded to each other; and
the touch control sub-circuits drive gate lines connected with them when they are triggered by the gate drive triggering signal and the display clock signal.

19. The touch circuit according to claim 2, characterized in that the touch control sub-circuits each comprise at least one shift register unit.

20. The touch circuit according to claim 4, characterized in that the touch control sub-circuits each comprise at least one shift register unit;
the touch drive sub-circuits each comprise at least one first gating circuit corresponding to the shift register unit;
an output end of the shift register unit is connected to a first input end of the corresponding first gating circuit;
the third output end of the touch signal input module is connected to a second input end of the first gating circuit;
the first output end of the touch signal input module is connected to a first input end of the shift register unit;
the second output end of the touch signal input module is connected to a second input end of the shift register unit;
the output ends of the first gating circuits of the touch control sub-circuits are connected to the corresponding touch electrodes; and
the output ends of the shift register units of the touch control sub-circuits are connected to the first input ends of the shift register units of the next cascades of touch control sub-circuits.

* * * * *